(12) United States Patent
Yanagita

(10) Patent No.: US 12,257,721 B2
(45) Date of Patent: Mar. 25, 2025

(54) ROBOT CONTROLLER

(71) Applicant: FANUC CORPORATION, Yamanashi (JP)

(72) Inventor: Akihiro Yanagita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 228 days.

(21) Appl. No.: 17/907,167

(22) PCT Filed: May 6, 2021

(86) PCT No.: PCT/JP2021/017391
§ 371 (c)(1),
(2) Date: Sep. 23, 2022

(87) PCT Pub. No.: WO2021/230136
PCT Pub. Date: Nov. 18, 2021

(65) Prior Publication Data
US 2023/0094555 A1    Mar. 30, 2023

(30) Foreign Application Priority Data
May 12, 2020   (JP) .................................. 2020-083743

(51) Int. Cl.
*B25J 9/16*    (2006.01)
*B25J 9/00*    (2006.01)
(52) U.S. Cl.
CPC ........... *B25J 9/1666* (2013.01); *B25J 9/0081* (2013.01)
(58) Field of Classification Search
None
See application file for complete search history.

(56) References Cited

U.S. PATENT DOCUMENTS

| | | | |
|---|---|---|---|
| 6,360,143 B1 | 3/2002 | Yanagita | |
| 2004/0158335 A1* | 8/2004 | Fujibayashi | G05B 19/4067 700/63 |
| 2008/0234861 A1* | 9/2008 | Fortell | G05B 19/41815 700/245 |

FOREIGN PATENT DOCUMENTS

| | | | |
|---|---|---|---|
| JP | H02-259911 A | 10/1990 | |
| JP | H06-335883 A | 12/1994 | |

(Continued)

OTHER PUBLICATIONS

International Search Report issued in PCT/JP2021/017391; mailed Jul. 6, 2021.

*Primary Examiner* — Kyle T Johnson
*Assistant Examiner* — Arslan Azhar
(74) *Attorney, Agent, or Firm* — Studebaker Brackett PLLC

(57) ABSTRACT

The purpose of the present invention is to provide a robot controller that does not require manual correction when an applying process operation is interrupted due to occurrence of an error, and that enables automatic avoidance of occurrence of an interrupted part (gap) of the applying process and occurrence of excessive processing upon resuming the applying process operation. When an applying operation is interrupted, if the operation has stopped after further advancement of the operation site from the position of interruption, the operation site is moved back by a predetermined distance along the curved trajectory at the time of an advancing movement prior to the stopping, and the advancing movement is resumed from the moved-back position along the curved trajectory. Thus, it is possible to resume the continuous process while the operation site, at the position where the continuous process operation has been interrupted, proceeds at the same speed as when the applying operation was interrupted.

6 Claims, 8 Drawing Sheets

(56) References Cited

FOREIGN PATENT DOCUMENTS

| JP | H09-216082 A | 8/1997 |
|---|---|---|
| JP | 3518127 B2 | 4/2004 |
| JP | 2007-268549 A | 10/2007 |
| JP | 2009-183942 A | 8/2009 |

* cited by examiner

Example of Calculated Smooth Curve
Connecting Series of Position Data
(Spline Curve)

ROBOT CONTROLLER

TECHNICAL FIELD

The present disclosure relates to a robot controller that performs a continuous processing task while advancing a tool attached to a distal end of a robot arm and, in particular, to a robot controller related to a resume control after the continuous processing task performed while advancing the tool attached to the distal end of the robot arm is interrupted.

BACKGROUND ART

A robot performs an application processing task such as a dispensing task. This application processing task is a continuous processing task that is performed while advancing a tool attached to a distal end of a robot arm. When there is some kind of error, the application processing task is interrupted first, and the tool attached to the distal end of the robot arm is then stopped after advancing by a certain distance with deceleration in a state application processing task is interrupted. When the application processing task is resumed from a stopped position after eliminating the cause of the error, the distance advanced with the deceleration in the state the application processing task is interrupted constitutes a part (gap) without the application processing performed thereon, which may cause a defect in the quality. Furthermore, since the application task is resumed before the speed of the tool attached to the distal end of the robot arm reaches the speed designated in a program, the processing amount per unit distance (for example, an amount of applied material in the case of the dispensing task) becomes excessive, which also results in a defect in the quality of the processing.

In order to overcome the disadvantages described above, Patent Document 1 discloses the following process: before an application processing task is resumed, a tool attached to a distal end of a robot arm is linearly retreated by a distance that is the sum of a distance advanced with deceleration in a state where the application processing task is interrupted and a distance required for a speed of the tool attached to the distal end of the robot arm to reach a speed designated in a program at a timing when the application processing task is to be resumed; the operation for advancing the tool is resumed from the location where the tool retreated has reached; and, upon the speed designated in the program is reached by acceleration at the point where the application processing task was interrupted, the application processing task is resumed from that point.

Patent Document 1: U.S. Pat. No. 6,360,143

DISCLOSURE OF THE INVENTION

Problems to be Solved by the Invention

According to Patent Document 1, it is possible to avoid having the part (gap) without the application processing performed thereon and excessive processing that can be caused at the time of resuming the application processing task. However, the technique of Patent Document 1 is based on a precondition that the tool attached to the distal end of the robot arm advances linearly, and is not applicable to a tool that advances along a curved path.

In a case where the tool attached to the distal end of the robot arm advances along a curved path, the process of Patent Document 1, according to which the linear retreat is carried out, cannot be used because there may be a collision with an obstacle when the tool at the distal end of the robot arm is linearly retreated. For this reason, in a case where the application processing task is interrupted due to an error while the tool attached to the distal end of the robot arm is advancing along a curved path, there is no other choice but to resume the application processing task without the retreat operation. Consequently, it is necessary to manually rework the part (gap) without the application processing performed thereon and excessive processing caused at the time of resuming the application processing.

Therefore, there is a demand for a control that is performable also in a case where the application processing task is interrupted due to an error while a tool attached to the distal end of a robot arm is advancing along a curved path, and that eliminates the need for manual rework by automatically avoiding having a part (gap) without the application processing performed thereon and excessive processing that may be caused at the time of resuming the application processing.

Means for Solving the Problems

In order to overcome the foregoing disadvantages, the present disclosure provides a robot controller for performing a continuous processing task while advancing a tool attached to a distal end of a robot arm of a robot at a desired speed along a desired curved path according to a program. The robot controller includes: a storage unit that, in a case where the continuous processing task is interrupted and the tool stops after advancing further in a decelerating manner from an interrupted position of the continuous processing task, stores the interrupted position of the continuous processing task and an advancing speed of the tool at the interrupted position of the continuous processing task; and a processing unit that calculates a command signal to be given to the robot, the command signal being for the tool to reverse, until a reversed position, by a prescribed distance along a curved path where the tool has been in advancing motion before stopping, and to resume, from the reversed position, the advancing motion so as to move forward along the curved path where the tool has been in the advancing motion before the stopping, thereby allowing the tool to resume the continuous processing task by advancing from the interrupted position of the continuous processing task stored in the storage unit and at the advancing speed stored in the storage unit.

Effects of the Invention

According to the robot controller of the present disclosure, in a case where the application processing task is interrupted due to an error while the tool attached to the distal end of the robot arm is advancing along the curved path, it is possible to continue the application processing task efficiently without having to do rework manually on the part (gap) without the application processing performed thereon and excessive processing that may occur at the time of resuming the application processing task while avoiding collision with the obstacle.

PREFERRED MODE FOR CARRYING OUT THE INVENTION

Embodiments of the present disclosure will be described in detail with reference to the accompanying drawings.

Figure 1:
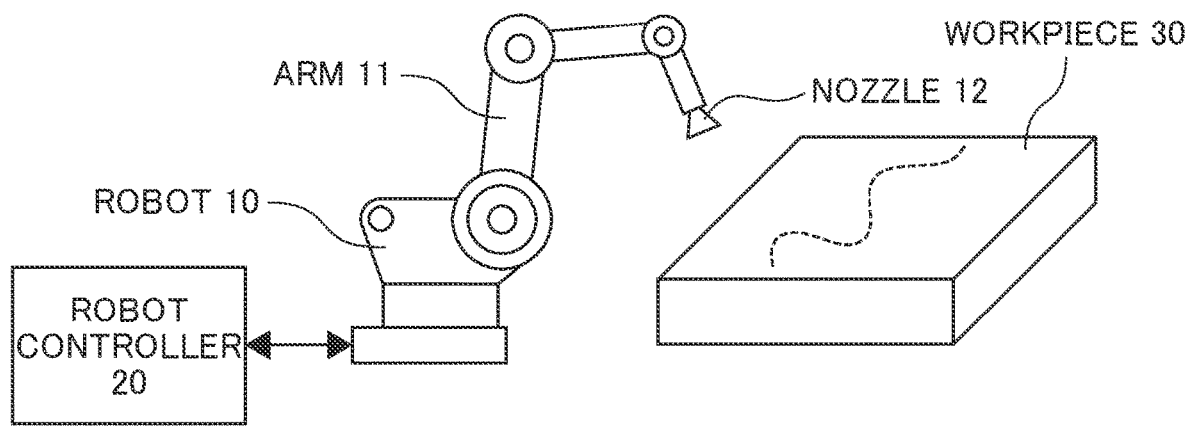
FIG. 1 is a diagram illustrating a configuration of a robot system according to a present disclosure.

In the following example, a dispensing application processing task is described as application processing performed by an industrial robot. However, this is a non-limiting example, and the same technique can be applied to other types of application processing (for example, application of sealing material, plasma irradiation, laser welding, and the like). Furthermore, in the following example, a tool attached to a distal end of a robot arm is referred to as a "nozzle". FIG. 1 is a diagram illustrating a configuration of a robot system that is common to the embodiments according to the present disclosure. The robot 10 illustrated in FIG. 1 is an articulated type robot with an articulated arm 11 of 6-axis vertical multiple joints, 4-axis vertical multiple joints, or the like. At the distal end of the arm 11, a nozzle 12 (tool) for applying a material onto a workpiece 30 is attached. A dispensing task is performed is such a manner that a robot controller 20 controls a servo motor 14 (FIG. 2) integrated in each of joint sections of the arm 11 of the robot 10 to operate the arm 11 such that the nozzle 12 moves at a prescribed speed along a curved path that smoothly connects a series of operation commands (taught positions) taught in a user program so as to move the nozzle 12 at a prescribed speed along a prescribed curved path on the workpiece 30 and inject material at a prescribed flow rate at a moment when the nozzle 12 reaches a prescribed position. In the user program, not only the information regarding the taught positions of the nozzle 12 but also information necessary for application processing, such as movement speed of the nozzle 12, forms (movement forms such as a straight line, an arc line, a spline curve, and the like) in which the nozzle 12 moves, material discharge positions, discharge flow rate, and the like, is written.

Figure 2:
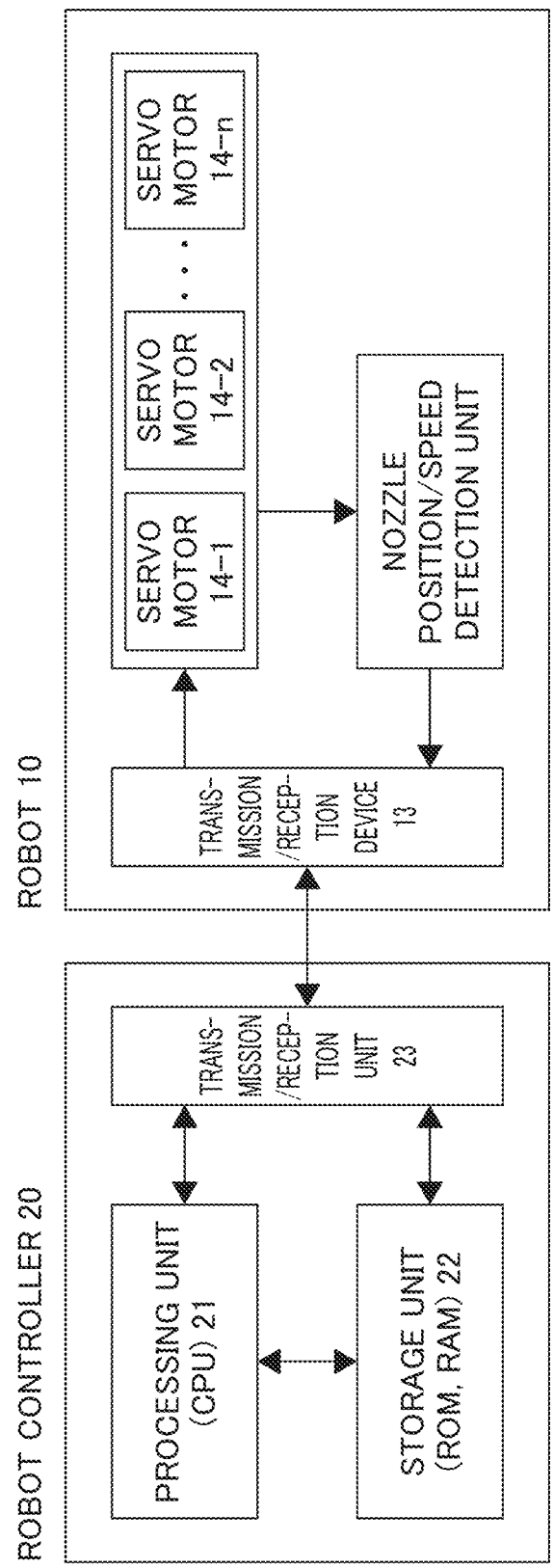
FIG. 2 is a block diagram illustrating a relationship regarding transmission and reception of signals at the time of robot control according to the present disclosure.

FIG. 2 is a block diagram illustrating a relationship regarding transmission and reception of signals between the robot controller 20 and the robot 10, between the units of the robot controller 20, and between the members of the robot 10 while the robot control is performed. The robot controller 20 includes, as constituent elements, a processing unit (CPU) 21 configured with a microcomputer or the like, a storage unit 22 including memory members such as a ROM, a RAM, and the like, and a transmission/reception unit 23 that transmits/receives signals to/from the robot 10. In the meantime, the robot 10 includes: a transmission/reception device 13 that performs transmission/reception of signals to/from the robot controller; a plurality of servo motors 14-1, 14-2, . . . , 14-n integrated in each of the joint sections or the like of the arm for moving the arm; and a nozzle position/speed detection unit that detects the position and movement speed of the nozzle by receiving signals from the servo motors.

The user program for allowing the nozzle 12 of the robot 10 to perform application while moving along a desired path and taught data of the positions, advancing speed, and the like of the tool are stored in the storage unit 22 of the robot controller 20, and the processing unit (CPU) calculates command signals for the plurality of servo motors 14-1, 14-2, . . . , 14-n of the robot 10 based on the stored data read out from the storage unit 22, feedback data received from the robot 10, and the like, and gives the command signals to each of the servo motors 14-1, 14-2, . . . , 14-n via the transmission/reception unit 23 and the transmission/reception device 13.

In the robot 10, the plurality of servo motors 14-1, 14-2, . . . , 14-n are rotated according to the command signals received from the robot controller 20, and position and movement speed data of the nozzle 12 on a specific interval is detected from the data of the actual rotation number and rotation speed of each of the serve motors detected on the specific interval in each of the servo motors 14-1, 14-2, . . . , 14-n. The detected data is sent to the robot controller 20 via the transmission/reception device 13 and the transmission/reception unit 23 and stored in the storage unit 22 as the nozzle position and movement speed data on the specific interval or used directly by the processing unit (CPU) 21 for command signal calculation processing in some cases. Note that the detection method of detecting the nozzle position and movement speed is not relative to the spirit of the present disclosure. While the nozzle position and movement speed in the present embodiment are detected from the data of the actual rotation number and rotation speed of each of the servo motors, those may be acquired from data detected by a nozzle detection device (a camera or the like) placed at a specific position, for example.

Figure 3:
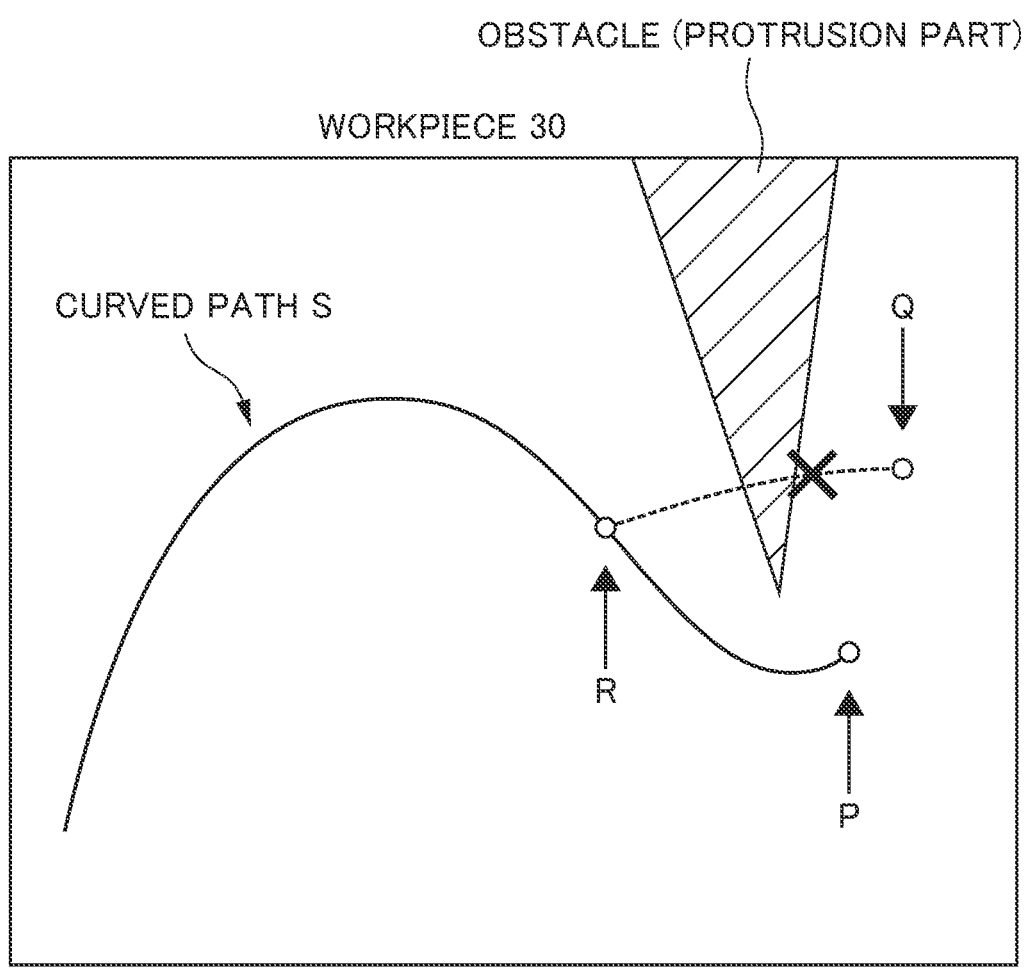
FIG. 3 is a diagram illustrating a curved path when application on a workpiece is interrupted.

Next, moving operations of the nozzle 12 attached to the distal end of the robot arm and a control method for the moving operations related to the dispensing task according to the embodiments of the present disclosure will be described. FIG. 3 illustrates a state where an error occurs in the robot 10 when a dispensing task is being performed along a curved path S on the workpiece 30 by the nozzle 12, so that the dispensing task is interrupted at a point P and the nozzle 12 is stopped at a point Q. A point R indicates the point to which the nozzle 12 stopped at the point Q is to return for implementing the present disclosure. Furthermore, on the workpiece 30, there is a protrusion provided as an obstacle with which that the nozzle 12 may collide when directly returning to the point R from the point Q.

Figure 4:
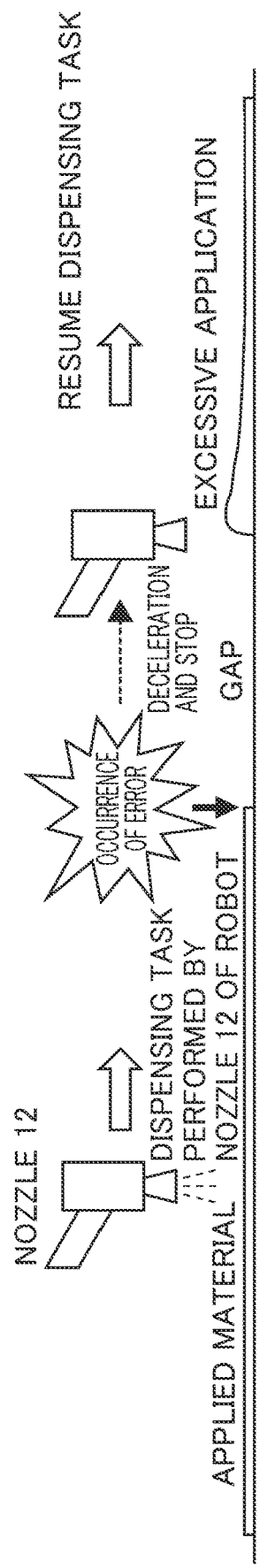
FIG. 4 is a diagram illustrating an application state after resuming a dispensing task in a conventional case.

Since the application path on the workpiece 30 is a curve, it is conceivable to use a method of storing all interpolation data (nozzle position data on every specific interval) at the time of advancing the nozzle, in order to follow the path in a backward direction in a state where the dispensing task of the nozzle is interrupted. However, when all interpolation data is stored, there is a drawback that the stored amount will be enormous. Furthermore, if the nozzle 12 is to return to the point R directly along a straight line, the nozzle 12 may collide with the protrusion as the obstacle and it may be difficult to return on a straight line. Therefore, conventionally, application is resumed from the point Q (see FIG. 4 for an application state in the conventional case), and the section between the point P and the point Q is manually modified later.

Figure 5:
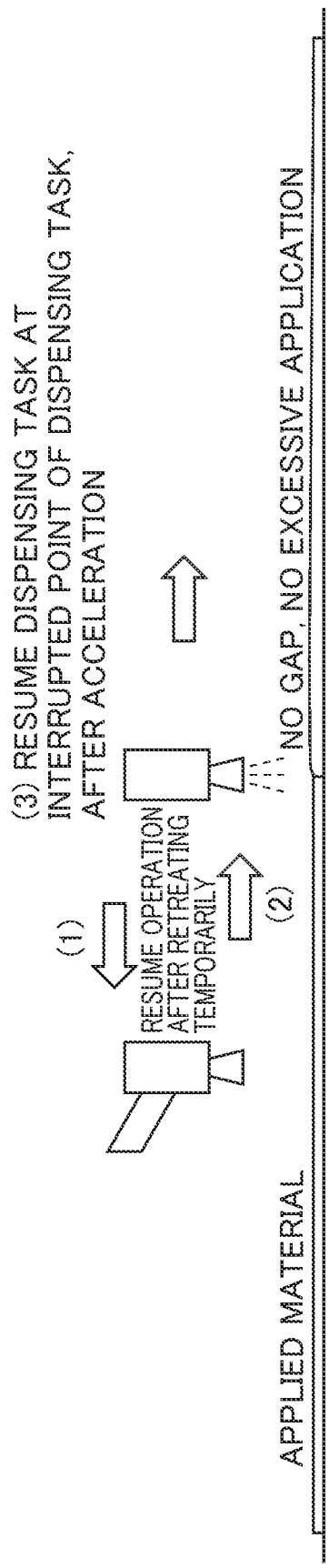
FIG. 5 is a diagram illustrating an application state after resuming a dispensing task in a case of the present disclosure.

According to the present disclosure, the three embodiments to be described later make it possible to determine the path in a state where the dispensing task is interrupted and to follow the path in a backward direction. Furthermore, it is possible to: return the nozzle 12, by following the curved path S, to the point R at which a sufficient distance can be secured for the nozzle 12 to reach the taught movement speed at the dispensing task interruption point P by acceleration from the start of movement of the nozzle 12; resume the movement of the nozzle 12 from the point R; and start the application at the taught movement speed of the nozzle upon reaching the point P. As a result, as illustrated in FIG. 5, it is possible to continue the dispensing task efficiently without causing the disadvantages relating to a gap and excessive application occurred in the case illustrated in FIG. 4.

Figure 6:
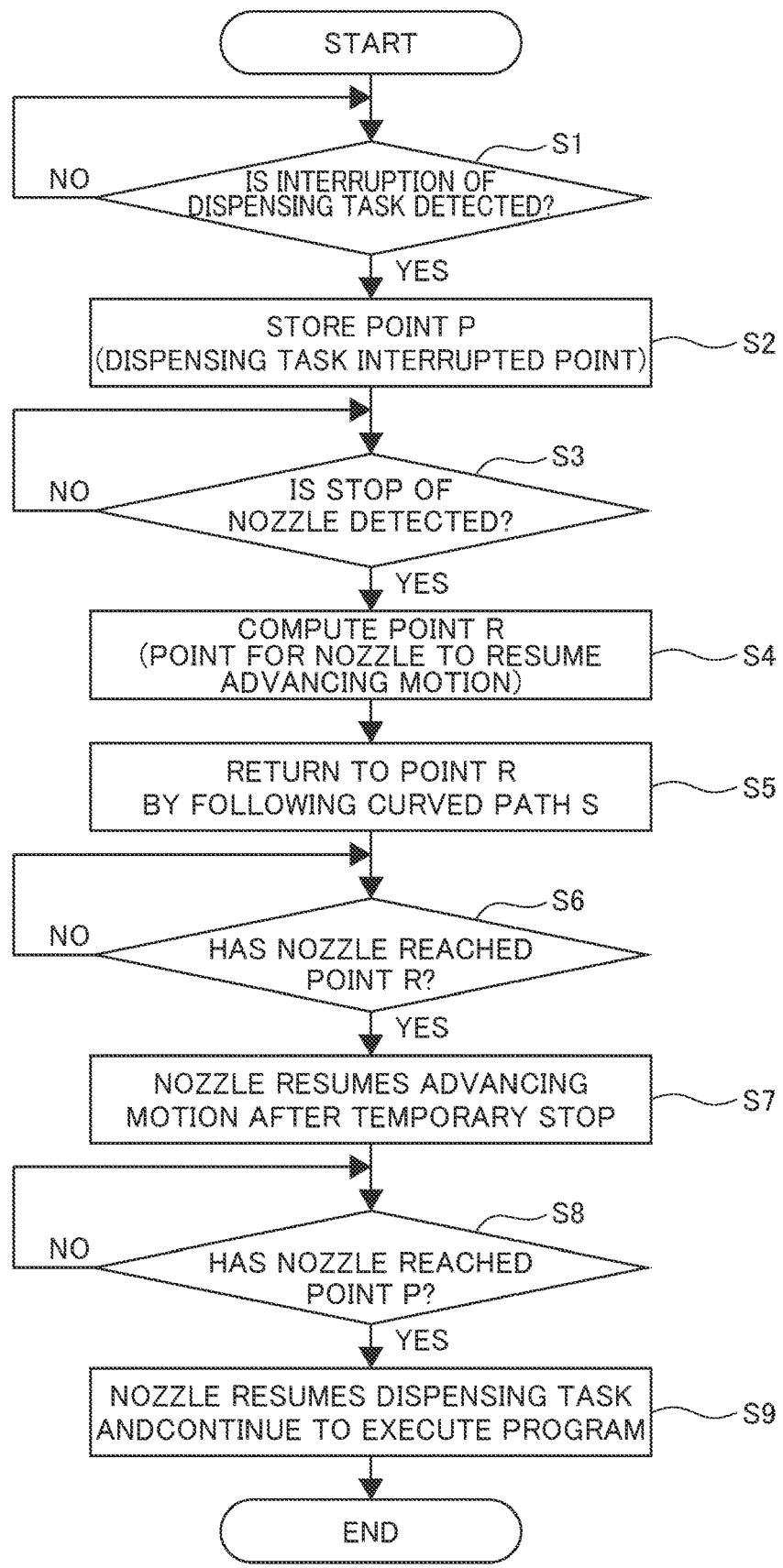
FIG. 6 is a flowchart illustrating a procedure of the dispensing task according to the present disclosure.

Next, a procedure of the dispensing task according to the present disclosure is illustrated in a flowchart. As illustrated in FIG. 6, first, the procedure starts upon detection of an interruption of the dispensing task caused by an error or the like of the robot (Step ST1). When interruption of the dispensing task is not detected (NO in Step ST1), the procedure remains in a standby state until interruption of the dispensing task is detected. When interruption of the dispensing task is detected (YES in Step ST1), the robot controller 20 stores the point P where the dispensing task is interrupted (Step ST2).

Then, it is determined whether stop of the movement of the nozzle is detected (Step ST3). When stop of the movement of the nozzle is not detected (NO in Step ST3), the procedure is in a standby state until stop of the movement of the nozzle is detected. When stop of the movement of the nozzle is detected (YES in Step ST3), then the point R is determined, at which the nozzle resumes the movement after the stop by following the curved path S in a backward direction (Step ST4).

In order to determine the point R at which the nozzle resumes the movement after the stop by following the curved path S in a backward direction in Step ST4, it is necessary to grasp a moving path of the nozzle with a distance sufficient to return to the point R by following the curved path S. As the way of grasping the moving path of the nozzle, three embodiments will be described later in the present description.

Thereafter, the nozzle returns to the point R by following the moving path thereof (Step ST5). Note here that it is possible for the nozzle to avoid collision with the obstacle by returning to the point R determined in Step ST4 not directly along a straight line, but by following the moving path of the nozzle. Then, it is determined whether the nozzle has reached the point R (Step ST6). When the nozzle has not reached the point R (NO in Step ST6), the procedure is in a standby state until the nozzle reaches the point R. When the nozzle has reached the point R (YES in Step ST6), the nozzle is then stopped temporarily and then is caused to resume moving in the forward direction (Step ST7).

Thereafter, it is determined whether the nozzle has reached the point P that is an interruption point of the dispensing task (Step ST8). When the nozzle has not reached the point P (NO in Step ST8), the procedure is in a standby state until the nozzle reaches the point P. When the nozzle has reached the point P (YES in Step ST8), the dispensing task taught in the user program is resumed from that point and, thereafter, the user program of the dispensing task including the movement of the nozzle is continuously executed (Step ST9). Thereby, the flow is ended.

In order to implement the present disclosure, when the nozzle moves along the curved path S, if all interpolation data (nozzle position data on every specific interval) is stored while the nozzle is moving, a vast volume of storage capacity is required. If the interval on which the nozzle position data is to be stored is prolonged for that reason, the curved path S along which the nozzle has moved cannot be grasped accurately, so that the distance moved along the curved path S cannot be acquired accurately.

Thus, in the first embodiment of the present disclosure, the position data (at least six values of XYZ position data and $\alpha\beta\gamma$ posture data (Euler angle data) within a 3D space, and includes additional axis data when there is an additional axis) of the nozzle 12 when the nozzle 12 moves forward along the curved path S is stored in a ring buffer area. In a case of storing the position data of the nozzle 12 in the ring buffer area, only position data in an amount that can be saved within a limited capacity can be stored. When the capacity required for storing the position data exceeds the storage capacity of the ring buffer area, the old (earliest) position data is cleared in order from the storage, thereby allowing new position data to be stored.

Figure 7:
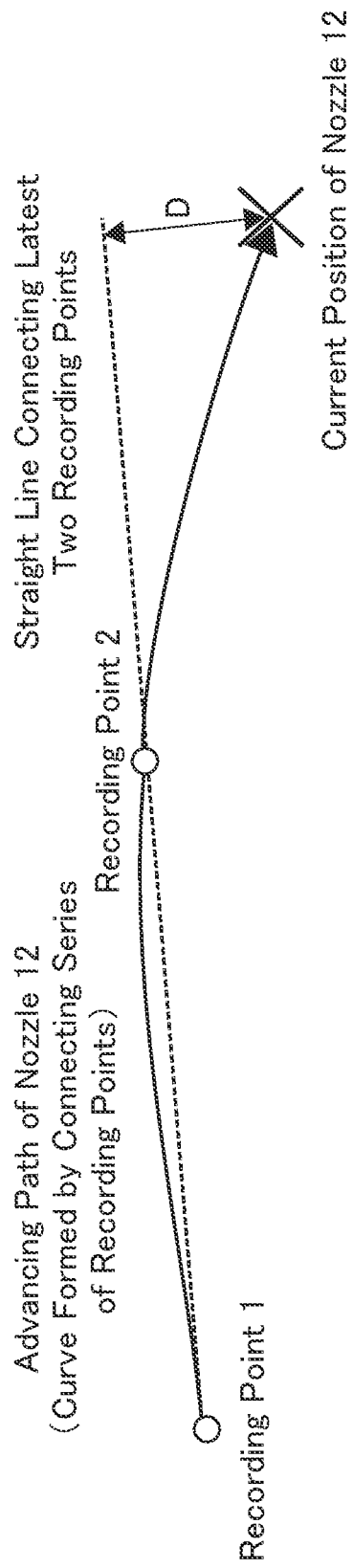
FIG. 7 is a diagram illustrating a distance between a straight line determined from a past position of a nozzle (tool) and a current position.
Figure 8:
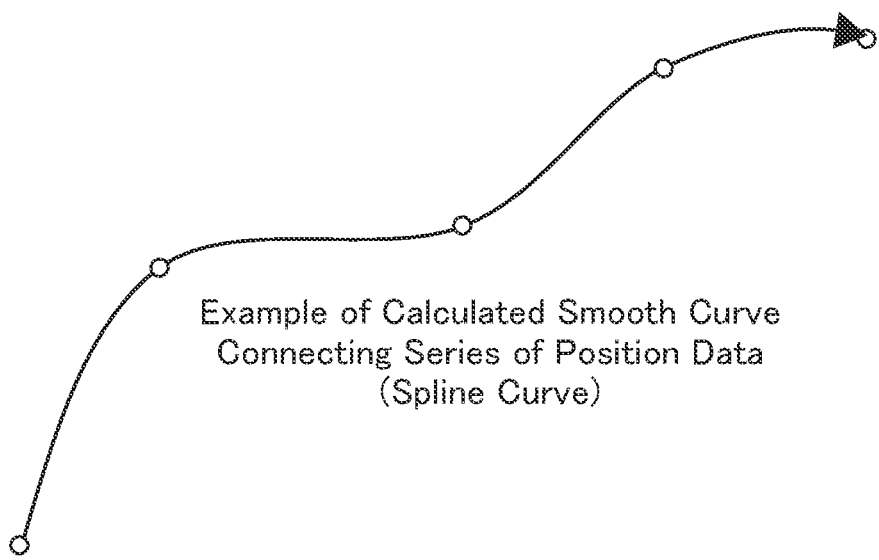
FIG. 8 is a spline curve that smoothly connects a series of position data.

As for the interval (cycle) for storing the position data of the nozzle 12, the interval required for suppressing the deviation distance from the original curved path S within a limit is secured. As the method for securing the interval required for suppressing the deviation distance from the original curved path S within a limit, there may be: a method of storing the position data on a prescribed interval (for example, every several centimeters); as illustrated in FIG. 7, a method of storing the position data of the nozzle 12 when the distance from a straight line, which connects two recording points (recording point 1, recording point 2) corresponding to the latest data and the next latest data among the data of the tool positions stored immediately before the present moment, to the current position of the nozzle 12 becomes equal to or greater than a specific distance D; or a combination of both methods.

By storing the position data of the nozzle 12 while the nozzle 12 is in advancing motion in the ring buffer area, the position data to be stored can be limited. The limited position data is the necessary and sufficient pieces of position data for the nozzle 12 to accurately reverse by a prescribed distance, thereby making it possible to grasp the curved path for reverse motion without requiring a large storage capacity.

In the second embodiment of the present disclosure, when the nozzle 12 moves forward along the curved path S while performing application processing, the nozzle 12 moves while storing, in the storage unit 22 of the robot controller 20, plan (curve) data that is computed (planned) to generate a curve that smoothly connects a series of position data of the nozzle 12 taught in the user program that controls the movement of the nozzle 12. (While this data includes various types such as a straight line, an arc line, and a spline curve, a set of parameters or data for writing those is referred to as "plan data" herein.) While a specific area is provided for storing the plan data, when there is no free area for storing new plan data, the oldest plan data is cleared to store the new data. As for the size of the area, a sufficient size for reversing the necessary distance is secured.

When in retreating motion, the nozzle 12 retreats by reversing a motion path according to the plan data stored when the nozzle 12 was advancing (motion path of the nozzle computed when the nozzle 12 was advancing), and therefore deviation from the original curved path S can be minimized.

In the third embodiment of the present disclosure, the nozzle 12 is caused to perform the retreating motion by using the taught position data in the user program for the nozzle 12 to move along the curved path S by the user program. Since the row number and the taught position under execution at the time when the execution of the user program is interrupted are known, some taught commands (taught positions) prior to the currently executed row are searched by going back in the user program, whereby a curve that starts from the current stop position of the nozzle 12 and smoothly connects the taught positions in a the backward direction is newly computed (planned) and the nozzle 12 is caused to reverse along the newly computed (planned) curve. Unlike the first and second embodiments, it is not necessary in the third embodiment to store the path of the positions of the nozzle 12 in the storage area during execution of advancing motion. Therefore, unnecessary control processing for storing the positions during execution of the advancing motion may be omitted, thereby making it possible to suppress the influence of the computing time upon the entire system.

Furthermore, in any of the first to the third embodiments, it is extremely important, when implementing the present disclosure, to make the position for resuming the dispensing task accurately coincide with the position (the point P) at which the dispensing task was interrupted. For this reason, the present disclosure is designed to accurately detect the position (the point P) at which the dispensing task was interrupted when an error occurred in the robot or the like and to perform fine adjustment of the timing for resuming the dispensing task after the nozzle 12 resumes the advancing motion. This feature enables fine adjustment of the position for resuming the dispensing task in forward and rearward directions and makes it possible to render the position for resuming the dispensing task precisely coincide with the interrupted position (the point P) of the dispensing task. This can be achieved as follows. That is, since the point P is on the curved path computed for the reverse motion or on a position extremely close to the curved path, the position on the curved path closest to the point P is found in advance before start of the reverse motion and defined as a point P'. As for the reverse motion, the position of the nozzle 12 on the curved path is calculated from moment to moment, so that the dispensing task is resumed at the moment where the calculated position passes through the point P'. To perform fine adjustment of the position for resuming the dispensing task in the forward and rearward directions is nothing but shifting the position of the point P' to the forward or rearward direction by the necessary distance along the curved path. Fine adjustment is performed internally by moving the point P' by the distance along the curved path in the manner as described above. On the other hand, in a case where the point P' is presented to the operator, it can be displayed as "distance" or "time" (because dividing distance by speed gives time).

Furthermore, in any of the first to third embodiments, when the nozzle 12 is in the reverse motion, it is necessary to avoid damaging the material applied on the curved path S due to the contact with the tip of the nozzle 12. Therefore, according to the present disclosure the height position of the nozzle 12 can be fine-adjusted in up and down directions when the nozzle 12 starts the reverse motion, and the height position can be returned to the original height taught position when the nozzle 12 resumes the advancing motion after having reversed by a prescribed necessary distance. This makes it possible to avoid contact between the tip of the nozzle 12 and the applied material on the curved path S. This can be achieved as follows. That is, the tip point (TCP: Tool Center Point) of the nozzle 12 is represented by a three-dimensional (or six-dimensional) position from the tool mount face of the arm 11, and the fine adjustment can be achieved by adding a necessary fine adjustment value to the Z-value of the TCP position only during the reverse motion. That is, by performing fine adjustment to bring about a state as if the TCP point of the nozzle is at a position ahead of the actual TCP point of the nozzle, the position of the nozzle 12 during the reverse motion can be shifted up or down by a necessary distance.

While the embodiments are described heretofore for implementing the present disclosure, it is to be noted that the present invention is not limited to the embodiments and various other embodiments are possible without departing from the spirit and scope of the present invention. For example, the content of the continuous processing task includes not only application of a coating material but also application of an adhesive and a sealing material. Furthermore, the present disclosure is applicable also to various kinds of surface treatment, pressing/injection task, plasma irradiation, and laser welding.

EXPLANATION OF REFERENCE NUMERALS

10 Robot
11 Arm
12 Nozzle (Tool)
13 Transmission/reception device of robot
14-1 to 14-$n$ Servo motor
20 Robot controller
21 Processing unit (CPU)
22 Storage unit
23 Transmission/reception unit of robot controller
30 Workpiece
P Dispensing task interrupted point
Q Nozzle stop point
R Point to which nozzle is supposed to return
S Curved path

The invention claimed is:
1. A robot controller for performing a continuous processing task while advancing a tool attached to a distal end of a robot arm of a robot at a desired speed along a desired curved path that smoothly connects a series of taught points, according to operation commands, taught in a user program, the robot controller comprising:
   memory members that, in a case where the continuous processing task is interrupted and the tool stops after advancing in a decelerating manner further from an interrupted position of the continuous processing task, store the interrupted position of the continuous processing task and an advancing speed of the tool at the interrupted position of the continuous processing task; and
   a processing unit (CPU) configured with a microcomputer that calculates a command to be given to the robot, the command being for the tool to reverse, until a reversed position, by a prescribed distance along a curved path where the tool has been in advancing motion before stopping, and controls the robot arm to resume, from the reversed position, the advancing motion based on the calculated command so as to move forward along the curved path where the tool has been in the advancing motion before the stopping, thereby allowing the tool to resume the continuous processing task by advancing from the interrupted position of the continuous processing task stored in the memory members and at the advancing speed stored in the memory members, wherein the memory members constantly store, at a prescribed interval, interpolation data that is position data of the tool in the advancing motion, wherein the curved path where the tool has been in the advancing motion before the stopping is grasped based on positions of the tool that are stored in the memory members, wherein the prescribed interval on which the interpolation data is stored as the position data of the tool occurs when a distance from a straight line to a current position on the curved path of the tool in the interpolation data becomes equal to or greater than a specific distance, the straight line connecting a point corresponding to an immediately closest preceding position from the current position of the tool to a point corresponding to a second closest preceding position from the current position on the curved path of the tool.

2. The robot controller according to claim 1, wherein the memory members include a ring buffer area that: constantly stores, on a prescribed interval, interpolation data that is position data of the tool in the advancing motion; and clears the interpolation data stored earliest when a stored amount exceeds a specific range.

3. The robot controller according to claim 1, wherein a curved path where the tool is in reverse motion before resuming the continuous processing task is grasped based on data of a curve computed from the interpolation data as the position data of the tool on the prescribed interval according to a program that controls the advancing motion of the tool when the tool is in the advancing motion.

4. The robot controller according to claim 1, wherein the robot controller is capable of fine-adjusting, in forward and rearward directions, a position where the continuous processing task is resumed, to precisely coincide with the interrupted position of the continuous processing task.

5. The robot controller according to claim 1, wherein, the robot controller is capable of fine-adjusting a height position of the tool in up and down directions when the tool reverses by the prescribed distance from the position where the tool has stopped, and is capable of returning the height position to an original height taught position when the tool resumes the advancing motion after having reversed by the prescribed distance.

6. A robot controller for performing a continuous processing task while advancing a tool attached to a distal end of a robot arm of a robot at a desired speed along a desired curved path that smoothly connects a series of taught positions, according to operation commands, taught in a user program, the robot controller comprising:

memory members that, in a case in which the continuous processing task is interrupted and the tool stops after advancing in a decelerating manner further from an interrupted position of the continuous processing task, store the interrupted position of the continuous processing task and an advancing speed of the tool at the interrupted position of the continuous processing task; and a processing unit (CPU) configured with a microcomputer that calculates a command to be given to the robot, the command being for the tool to reverse, until a reversed position, by a prescribed distance along a curved path where the tool has been in advancing motion before stopping, and controls the robot arm to resume, from the reversed position, the advancing motion based on the calculated command so as to move forward along the curved path where the tool has been in the advancing motion before the stopping, thereby allowing the tool to resume the continuous processing task by advancing from the interrupted position of the continuous processing task stored in the memory members and at the advancing speed stored in the memory members, wherein a curved path where the tool is in reverse motion before resuming the continuous processing task is grasped based on taught position data in the user program for the tool, the taught positions being stored in correspondence with a distance required for the tool to reverse the prescribed distance along the curved path while the tool is in the advancing motion, wherein it is not necessary to store the path of the positions of the tool in the memory members during execution of advancing motion, therefore, unnecessary control processing for storing the positions during execution of the advancing motion may be omitted.

* * * * *